(12) United States Patent
Jacobson et al.

(10) Patent No.: US 9,660,811 B2
(45) Date of Patent: May 23, 2017

(54) APPARATUS AND METHOD FOR PROTECTING MESSAGE DATA

(71) Applicant: QUALCOMM Incorporated, San Diego, CA (US)

(72) Inventors: David Jacobson, San Diego, CA (US); Billy Brumley, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/659,024

(22) Filed: Mar. 16, 2015

(65) Prior Publication Data

US 2015/0188708 A1  Jul. 2, 2015

Related U.S. Application Data

(62) Division of application No. 13/764,524, filed on Feb. 11, 2013.

(60) Provisional application No. 61/701,384, filed on Sep. 14, 2012.

(51) Int. Cl.
| | |
|---|---|
| H04L 9/32 | (2006.01) |
| H04L 9/00 | (2006.01) |
| H04L 29/06 | (2006.01) |
| H04W 12/02 | (2009.01) |
| H04W 28/06 | (2009.01) |

(52) U.S. Cl.
CPC ............ *H04L 9/3242* (2013.01); *H04L 9/002* (2013.01); *H04L 9/3223* (2013.01); *H04L 9/3239* (2013.01); *H04L 63/0428* (2013.01); *H04L 63/123* (2013.01); *H04L 63/1475* (2013.01); *H04L 63/166* (2013.01); *H04L 69/04* (2013.01); *H04W 12/02* (2013.01); *H04W 28/06* (2013.01); *H04L 2209/16* (2013.01); *H04L 2209/20* (2013.01); *H04L 2209/24* (2013.01); *H04L 2209/30* (2013.01)

(58) Field of Classification Search
CPC ............ H04L 63/1441; H04L 63/1408; H04L 63/145; G06F 21/55; G06F 21/56
USPC ......... 726/22–25; 380/28, 255; 713/189–193
See application file for complete search history.

(56) References Cited

U.S. PATENT DOCUMENTS

| | | | |
|---|---|---|---|
| 5,231,668 A | 7/1993 | Kravitz | |
| 6,950,518 B2 | 9/2005 | Henson et al. | |
| 7,197,142 B2 | 3/2007 | Alten | |
| 7,222,233 B1 * | 5/2007 | Rubin | H04L 9/0863 |
| | | | 713/160 |

(Continued)

FOREIGN PATENT DOCUMENTS

JP      2012129920 A    7/2012

OTHER PUBLICATIONS

Hollenbeck S., et al., "RFC 3749: Transport Layer Security Protocol Compression Methods", Internet Engineering Task Force, May 1, 2004 (May 1, 2004), XP015009529.

(Continued)

*Primary Examiner* — Alexander Lagor
(74) *Attorney, Agent, or Firm* — Won Tae C. Kim

(57) ABSTRACT

Disclosed is a method for protecting message data. In the method, the message data is padded with padding bits generated based on a deterministic function performed on the message data. The padded message data is compressed to generate compressed data. A length of the compressed data is dependent on the padding bits. The compressed data is encrypted to generate encrypted message data.

21 Claims, 9 Drawing Sheets

(56) References Cited

U.S. PATENT DOCUMENTS

| | | | |
|---|---|---|---|
| 8,127,130 | B2 | 2/2012 | Ellis et al. |
| 2002/0056042 | A1 | 5/2002 | Van et al. |
| 2002/0078351 | A1* | 6/2002 | Garib ............... G06Q 20/3674 713/168 |
| 2002/0091933 | A1 | 7/2002 | Quick et al. |
| 2002/0184504 | A1 | 12/2002 | Hughes |
| 2009/0061934 | A1 | 3/2009 | Hauck et al. |
| 2009/0138710 | A1 | 5/2009 | Minematsu |
| 2012/0079281 | A1 | 3/2012 | Lowenstein et al. |
| 2013/0145047 | A1* | 6/2013 | Short ............... H04L 69/04 709/247 |
| 2014/0019771 | A1* | 1/2014 | Emmett ............... H04L 9/002 713/189 |
| 2014/0079213 | A1 | 3/2014 | Jacobson et al. |
| 2014/0114937 | A1* | 4/2014 | Chen ............... H03M 7/3084 707/693 |
| 2015/0188709 | A1 | 7/2015 | Jacobson |

OTHER PUBLICATIONS

Kelsey J., et al., "Compression and Information Leakage of Plaintext", In: "Fast Software Encryption", Jan. 1, 2002 (Jan. 1, 2002), Springer, Berlin, Heidelberg, vol. 2365, pp. 263-276, XP55095581, ISBN: 978-3-54-044009-3, DOI: 10.1007/3-540-45661-9_21.

Ristic, I., "CRIME: Information Leakage Attack against SSL/TLS, Security Labs, Qualys Community", Sep. 14, 2012 (Sep. 14, 2012), XP55095627.

Ritter, T., "Details on the "Crime" Attack", ISEC Partners, Sep. 14, 2012 (Sep. 14, 2012), XP55095572.

Turner S., et al., "RFC 6151: Updated Security Considerations for the MD5 Message-Digest and the HMAC-MD5 Algorithms", Internet Engineering Task Force, Mar. 7, 2011 (Mar. 7, 2011), XP015075904.

Paterson, K G., "Tag Size Does Matter: Attacks and Proofs for the TLS Record Protocol", Springer Berlin Heidelberg, 2011, vol. 7073, pp. 372-389.

Dierks T., et al., "The Transport Layer Security (TLS) Protocol Version 1.2," RFC 5246, Internet Engineering Task Force, IETF, Aug. 1, 2008 (Aug. 1, 2008), XP015060256, 8 pages.

European Search Report—EP15193854—Search Authority—The Hague—Feb. 24, 2016.

Fouque P-A., et al., "HMAC is a Randomness Extractor and Applications to TLS," Proceedings of the 2008 Acm Symposium on Information, Computer and Communications Security, ASIACCS '08, Jan. 1, 2008 (Jan. 1, 2008), pp. 21-32, XP055095636, New York, New York, USA.

\* cited by examiner

APPARATUS AND METHOD FOR PROTECTING MESSAGE DATA

CROSS-REFERENCE TO RELATED APPLICATION

This application is a divisional of U.S. patent application Ser. No. 13/764,524, filed Feb. 11, 2013, which application claims the benefit of U.S. Provisional Application No. 61/701,384, filed Sep. 14, 2012, which applications are incorporated herein by reference.

BACKGROUND

Field

The present invention relates generally to protecting message data that is compressed and encrypted.

Background

An attack may be made on a secure connection (for example, SSL/TLS) that uses compression because the length of the encrypted and compressed message may be exploited to discover information. When an attacker can control some text in the uncompressed message, the attacker can cycle through digits (or bytes) until he finds one that results in the shortest encrypted message. For example, an encrypted message may include a tag like "secret=4528715." When the attacker's inserted uncompressed message is "secret=4", the compression will be better than for the other possible digits, such as "secret=0", and thus the length of the encrypted message will be shorter. After discovering the first digit, the attacker can cycle through the next possible digits (or bytes) until he finds one that results in a shorter length, e.g. "secret=45". The attacker can then cycle through the next digit (or byte), until all of the sensitive information has been discovered.

There is therefore a need for a technique for protecting a message that is both compressed and encrypted such that the length of the compressed message can not be determined from the compressed and encrypted data stream.

SUMMARY

An aspect of the present invention may reside in a method for protecting message data. In the method, the message data is padded with padding bits generated based on a deterministic function performed on the message data. The padded message data is compressed to generate compressed data. A length of the compressed data is dependent on the padding bits. The compressed data is encrypted to generate encrypted message data.

In more detailed aspects of the invention, the deterministic function may include a hash function. The padding bits may be prefixed or prepended to the message data. The padding bits may be constrained to allow an end of the padding bits to be determined by a receiver.

Another aspect of the invention may reside in a remote station, comprising: means for padding message data with padding bits generated based on a deterministic function performed on the message data; means for compressing the padded message data to generate compressed data, wherein a length of the compressed data is dependent on the padding bits; and means for encrypting the compressed data to generate encrypted message data.

Another aspect of the invention may reside in a remote station, comprising: a processor configured to: pad message data with padding bits generated based on a deterministic function performed on the message data; compress the padded message data to generate compressed data, wherein a length of the compressed data is dependent on the padding bits; and encrypt the compressed data to generate encrypted message data.

Another aspect of the invention may reside in a computer program product, comprising: computer-readable medium, comprising: code for causing a computer to pad message data with padding bits generated based on a deterministic function performed on the message data; code for causing a computer to compress the padded message data to generate compressed data, wherein a length of the compressed data is dependent on the padding bits; and code for causing a computer to encrypt the compressed data to generate encrypted message data.

Another aspect of the invention may reside in a method for protecting message data. In the method, a compression parameter value of a compression algorithm is selected using a deterministic function performed on the message data. The message data is compressed using the compression algorithm and the selected compression parameter value to generate compressed data. A length of the compressed data is dependent on the compression parameter value. The compressed data is encrypted to generate encrypted message data.

In more detailed aspects of the invention, the compression parameter value may be a maximum chain length value. The deterministic function may include a hash function. Compressing the message data may comprise padding the message data with a number of padding bits selected based on the deterministic function to generate padded message data, and generating the compressed data by using the compression algorithm and the selected compression parameter value on the padded message data. The padding bits may be prefixed to the message data. The padding bits may be constrained to allow an end of the padding bits to be determined by a receiver.

Another aspect of the invention may reside in a remote station, comprising: means for selecting a compression parameter value of a compression algorithm using a deterministic function performed on message data; means for compressing the message data using the compression algorithm and the selected compression parameter value to generate compressed data, wherein a length of the compressed data is dependent on the compression parameter value; and means for encrypting the compressed data to generate encrypted message data.

Another aspect of the invention may reside in a remote station, comprising: a processor configured to: select a compression parameter value of a compression algorithm using a deterministic function performed on message data; compress the message data using the compression algorithm and the selected compression parameter value to generate compressed data, wherein a length of the compressed data is dependent on the compression parameter value; and encrypt the compressed data to generate encrypted message data.

Another aspect of the invention may reside in a computer program product, comprising: computer-readable medium, comprising: code for causing a computer to select a compression parameter value of a compression algorithm using a deterministic function performed on message data; code for causing a computer to compress the message data using the compression algorithm and the selected compression parameter value to generate compressed data, wherein a length of the compressed data is dependent on the compression parameter value; and code for causing a computer to encrypt the compressed data to generate encrypted message data.

Another aspect of the invention may reside in a method for protecting message data. In the method, the message data is compressed to generate compressed data comprising a first number of data bytes. The compressed data is padded to generate padded compressed data comprising a second number of data bytes, wherein the second number is equal to the first number plus a pad number of data bytes, and the pad number of data bytes is determined based on a hash of the message data. The padded compressed data is encrypted to generate encrypted message data.

In more detailed aspects of the invention, the hash of the message data may be a keyed hash of the message data. The keyed hash of the message data may be performed using a Hashing for Message Authentication (HMAC) cryptographic hash function, and may use an obfuscation key derived using a key derivation function. The obfuscation key may be generated from an exchanged secret value. The key derivation function may use an encryption key and an authentication key to generate the obfuscation key. The encryption key and the authentication key may be generated from an exchanged secret value, and from a plurality of non-secret values. The pad number of data bytes may comprise a number from 1 to 32.

In other more detailed aspects of the invention, padding the compressed data to generate padded compressed data may comprise using a compression algorithm modified based on a deterministic function of the message data. The message data may comprise a Transport Layer Security (TLS) protocol message, or a Secure Socket Layer (SSL) protocol message.

Another aspect of the invention may reside in a remote station, comprising: means for compressing message data to generate compressed data comprising a first number of data bytes; means for padding the compressed data to generate padded compressed data comprising a second number of data bytes, wherein the second number is equal to the first number plus a pad number of data bytes, and the pad number of data bytes is determined based on a hash of the message data.

Another aspect of the invention may reside in a remote station, comprising: a processor configured to: compress message data to generate compressed data comprising a first number of data bytes; pad the compressed data to generate padded compressed data comprising a second number of data bytes, wherein the second number is equal to the first number plus a pad number of data bytes, and the pad number of data bytes is determined based on a hash of the message data.

Another aspect of the invention may reside in a computer program product, comprising: computer-readable medium, comprising: code for causing a computer to compress message data to generate compressed data comprising a first number of data bytes; code for causing a computer to pad the compressed data to generate padded compressed data comprising a second number of data bytes, wherein the second number is equal to the first number plus a pad number of data bytes, and the pad number of data bytes is determined based on a hash of the message data.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 2:
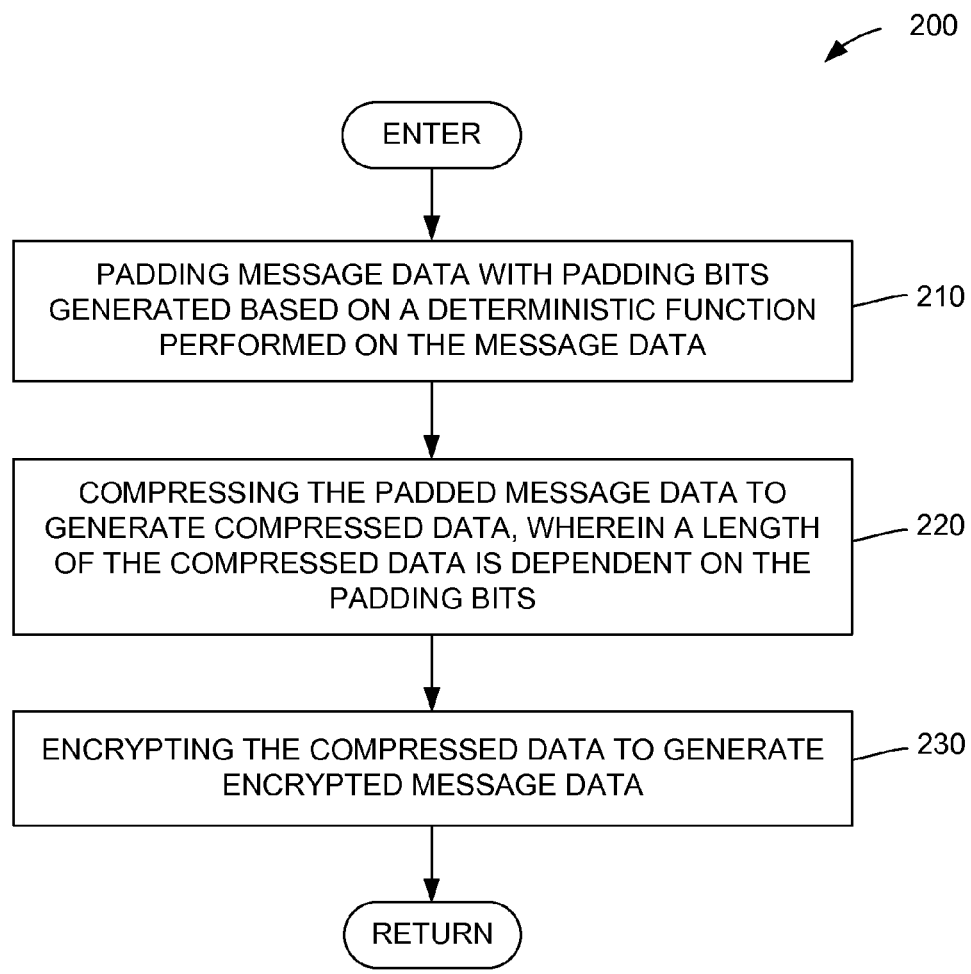
FIG. 2 is a flow diagram of a method for protecting message data, according to the present invention.
Figure 3:
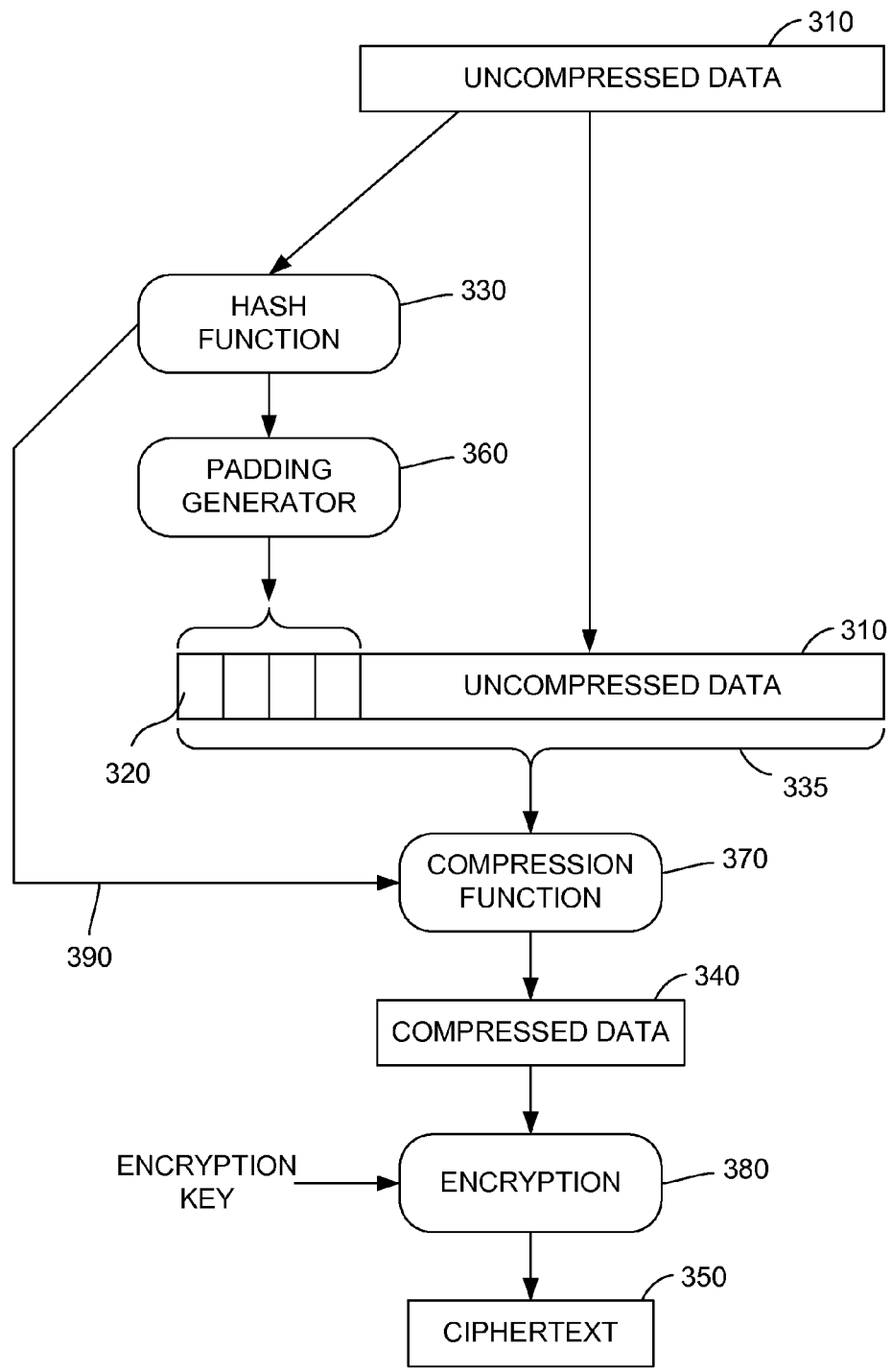
FIG. 3 is a flow diagram of data in a method for protecting message data.

With reference to FIGS. 2 and 3, an aspect of the present invention may reside in a method 200 for protecting message data 310. In the method, the message data is padded with padding bits 320 generated based on a deterministic function 330 performed on the message data (step 210). The padded message data 335 is compressed to generate compressed data 340 (step 220). A length of the compressed data is dependent on the padding bits. The compressed data is encrypted to generate encrypted message data 350 (step 230). An encryption function 380 uses an encryption key to encrypt the compressed data. The method secures a message that is both compressed and encrypted such that the length of the compressed message can not be determined from the compressed and encrypted data stream.

In more detailed aspects of the invention, the deterministic function 330 may include a hash function. A padding generator 360 takes a few bits from the hash function to determine the length of the padded message. The bits from the hash function are random-like. As a result, the compressed data 350 has a random-like length. Also, the bits from the hash function will not be compressed away to almost nothing because of the random-like nature of these bits from the hash function. The padding bits 320 may be prefixed or prepended to the message data 310.

The padding bits 320 may be constrained to allow an end of the padding bits to be determined by a receiver. For example, the most significant bit of all padding bytes but the last may be forced to 0, and the most significant bit of the last byte may be forced to 1. The message receiver will be able to determine the end of the padding by this pattern. As another example, the length of the padding may be put in the first 5 bits. (Assuming the maximum length is 32 bytes.) The rest of the bits may come from the hash function 330. A compression function 370 and a compression parameter value 390 are described below with respect to FIG. 6.

Figure 4:
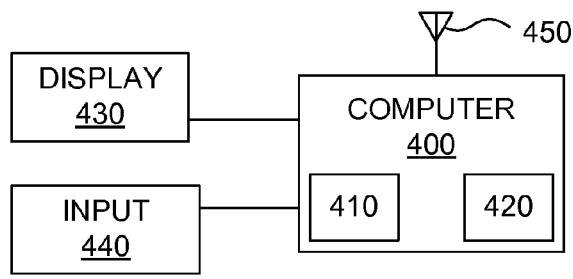
FIG. 4 is a block diagram of a computer including a processor and a memory.

With further reference to FIG. 4, another aspect of the invention may reside in a remote station 102, comprising: means 410 for padding message data 310 with padding bits 320 generated based on a deterministic function 330 performed on the message data; means 410 for compressing the padded message data 335 to generate compressed data 340, wherein a length of the compressed data is dependent on the padding bits; and means 410 for encrypting the compressed data to generate encrypted message data 350.

Another aspect of the invention may reside in a remote station 102, comprising: a processor 410 configured to: pad message data 310 with padding bits 320 generated based on a deterministic function 330 performed on the message data; compress the padded message data 335 to generate compressed data 340, wherein a length of the compressed data is dependent on the padding bits; and encrypt the compressed data to generate encrypted message data 350.

Another aspect of the invention may reside in a computer program product, comprising: computer-readable medium 420, comprising: code for causing a computer 400 to pad message data 310 with padding bits 320 generated based on a deterministic function performed on the message data; code for causing a computer to compress the padded message data 335 to generate compressed data 340, wherein a length of the compressed data is dependent on the padding bits; and code for causing a computer 400 to encrypt the compressed data to generate encrypted message data 350.

Figure 5:
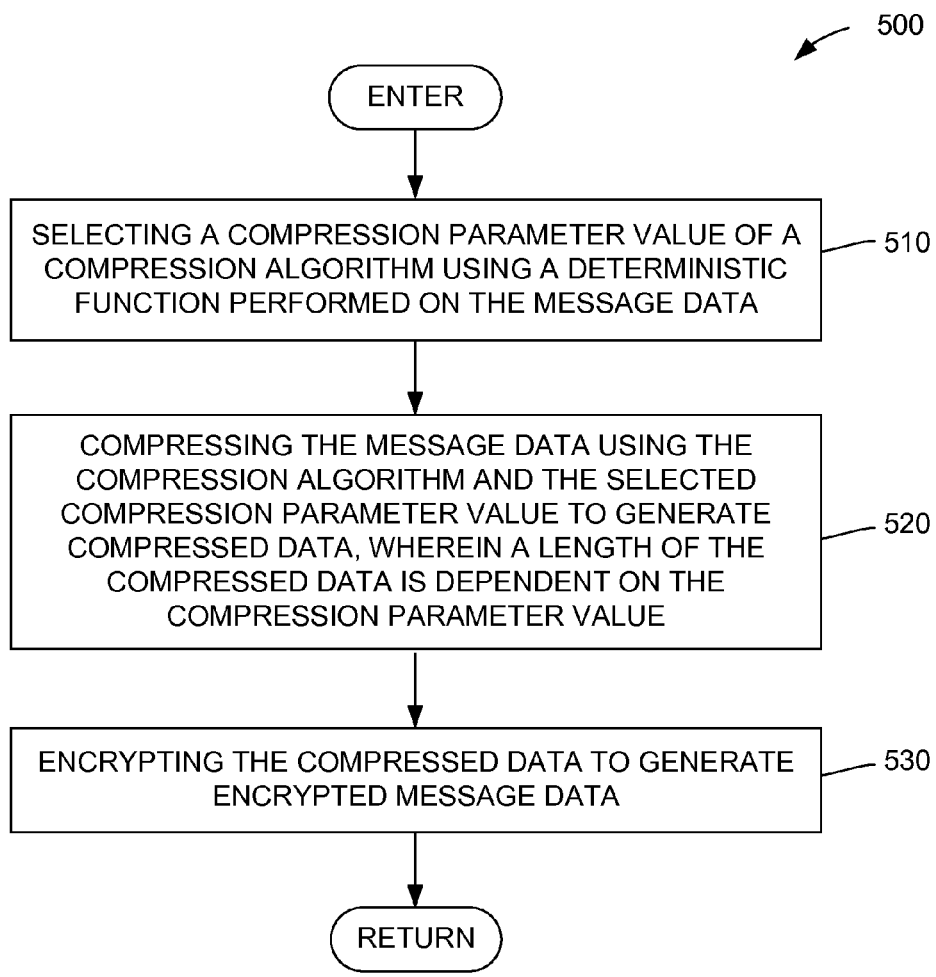
FIG. 5 is a flow diagram of another method for protecting message data, according to the present invention.
Figure 6:
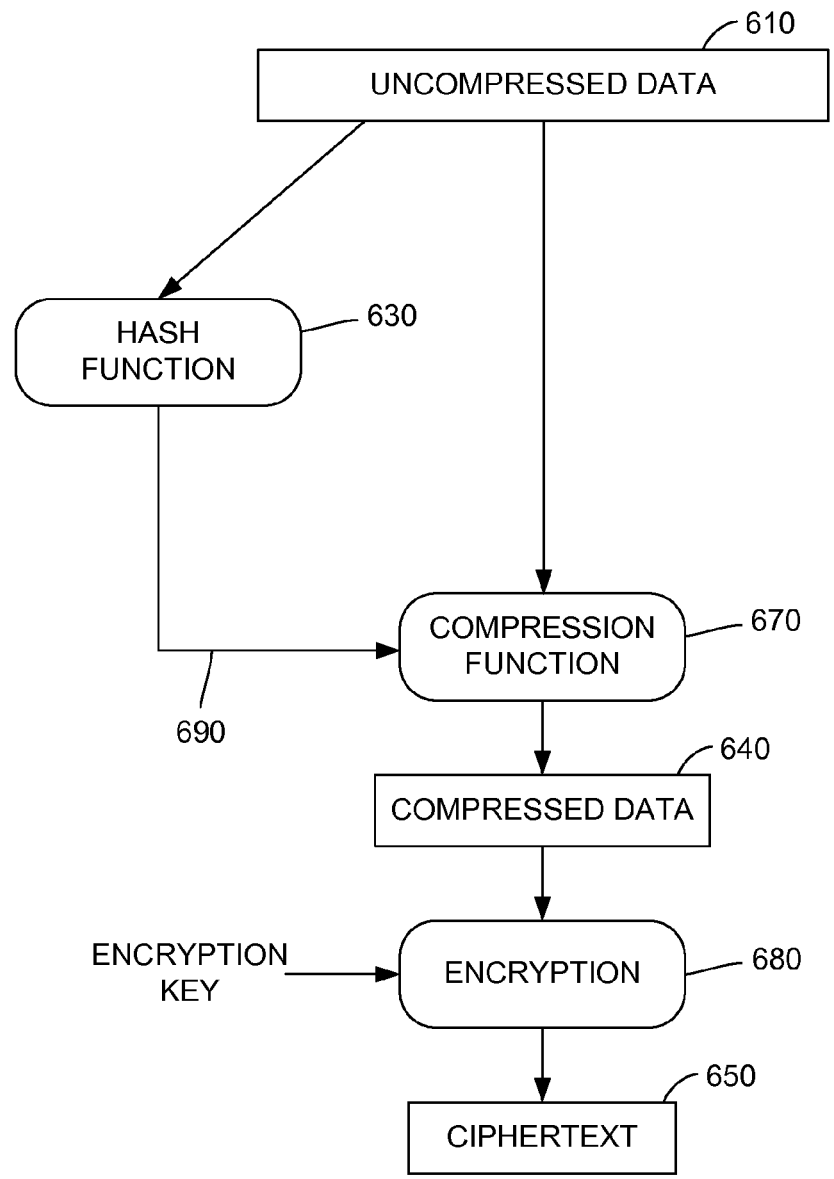
FIG. 6 is a flow diagram of data in another method for protecting message data.
Figure 7:
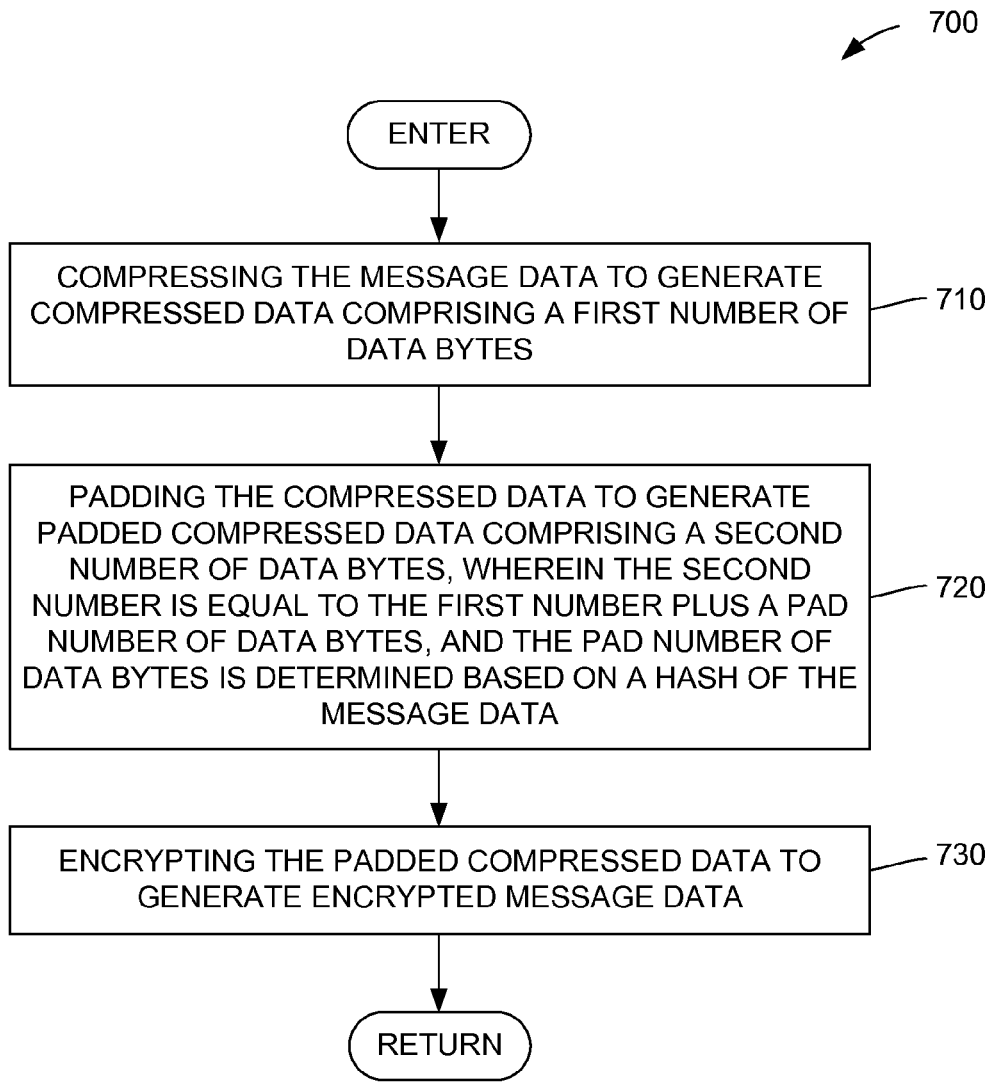
FIG. 7 is a flow diagram of another method for protecting message data, according to the present invention.
Figure 8:
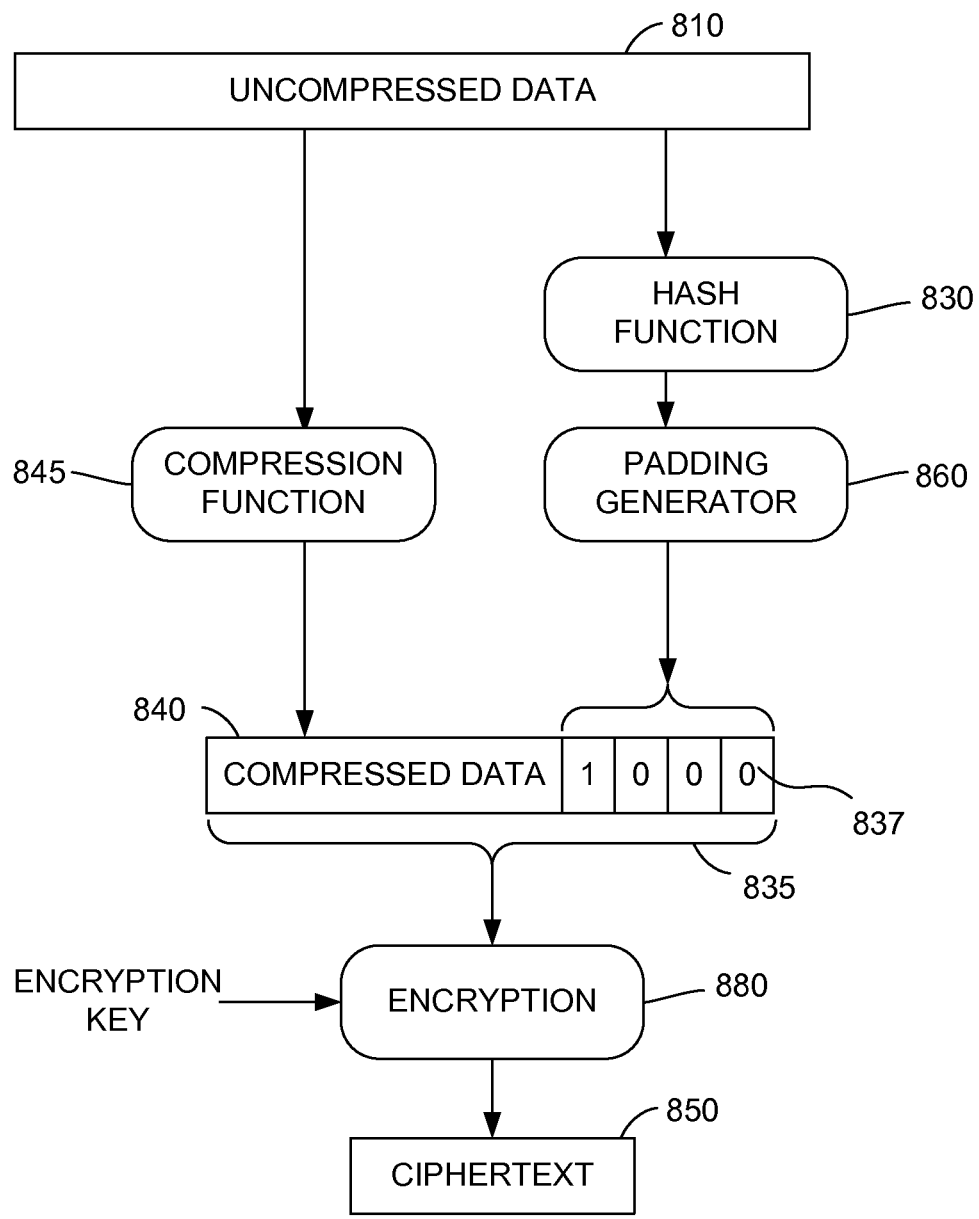
FIG. 8 is a flow diagram of data in another method for protecting message data.
Figure 9:
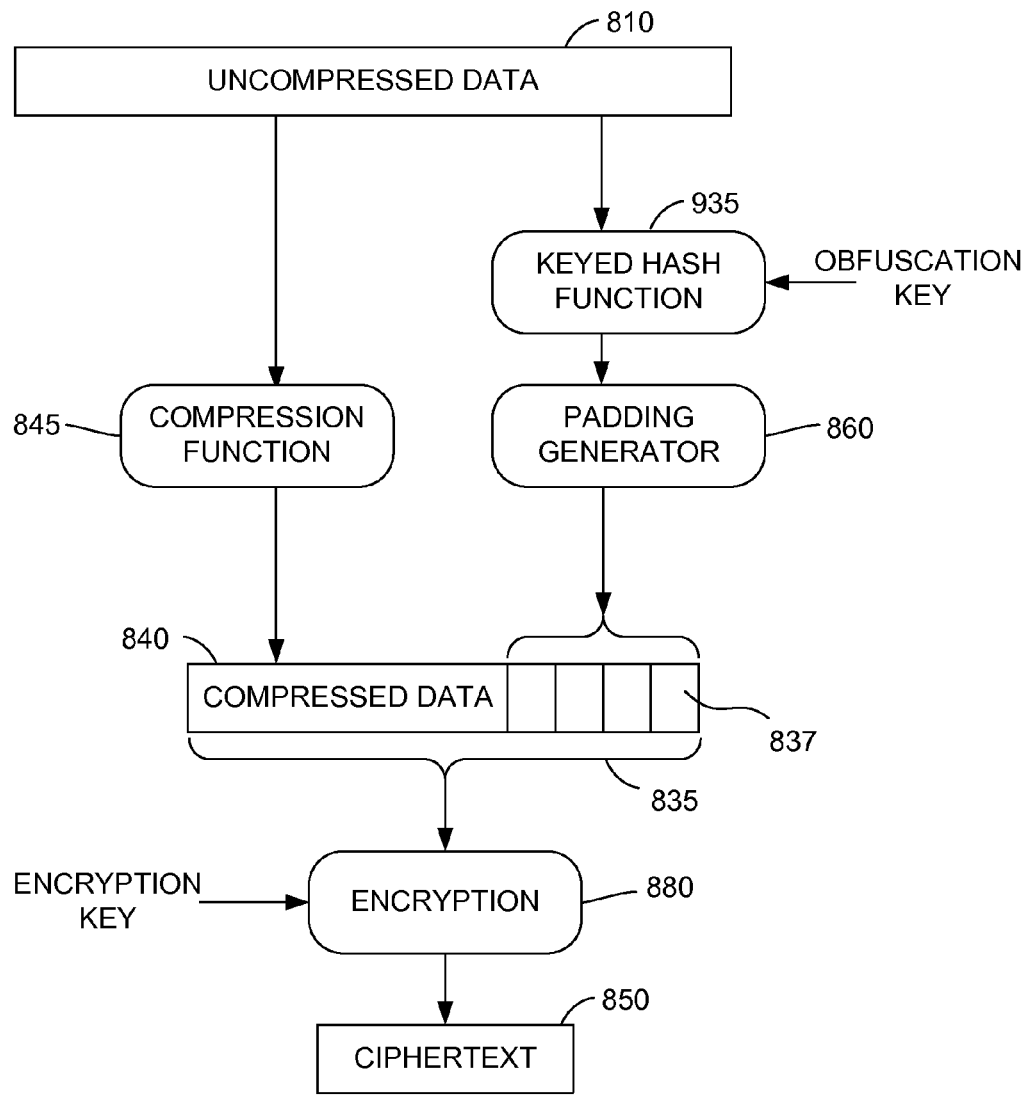
FIG. 9 is a flow diagram of data in another method for protecting message data.
Figure 10:
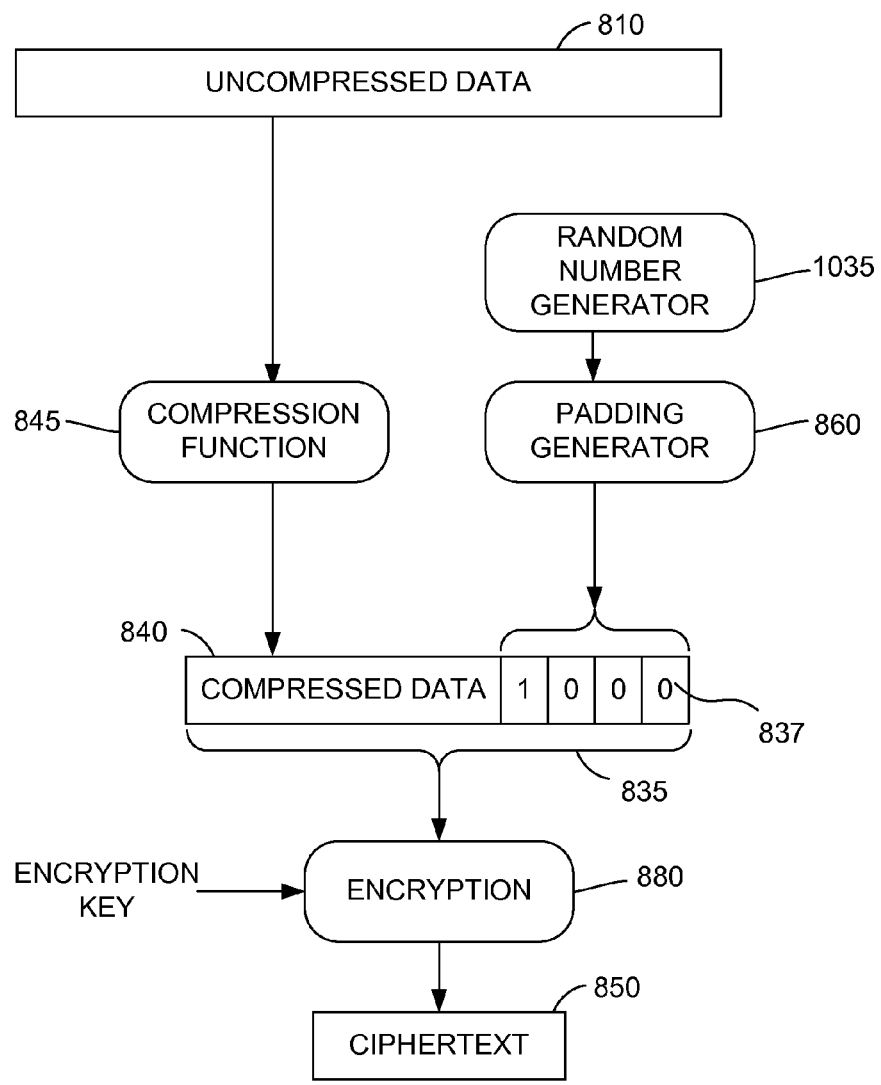
FIG. 10 is a flow diagram of data in another method for protecting message data.

With reference to FIGS. 5 and 6, another aspect of the invention may reside in a method 500 for protecting message data 610. In the method, a compression parameter value 690 of a compression algorithm of a compression function 670 is selected using a deterministic function 630 performed on the message data (step 510). The message data is compressed using the compression algorithm and the selected compression parameter value to generate compressed data 640 (step 520). A length of the compressed data is dependent on the compression parameter value. The compressed data is encrypted to generate encrypted message data 650 (step 530). An encryption function 680 uses an encryption key and an encryption algorithm to encrypt the compressed data.

In more detailed aspects of the invention, the compression parameter value may be a maximum chain length value. The deterministic function may include a hash function 630. A compression function 670 may make many choices during compression. The DEFLATE function, commonly used in compression of data on the web, has a parameter that indicates how aggressive the compression should be, with a range from 0 to 9. A few bits may be taken from the hash function, reduced into that range, and passed into a call to the compression function. This would cause the compression function behave differently if anything was changed in the message data.

In the DEFLATE function, several values may be used as internal tuning parameters: good_length, max_lazy, nice_length, and max_chain. The max_chain value, for example, controls the longest chain it will look for, etc. The DEFLATE function may be modified to accept these tuning parameters individually instead of as a single integer between 0 and 9 that is selected from a table. The tuning parameters may be selected using some of the bits from the output of the hash function 630.

Compressing the message data 610 may comprise padding the message data with a number of padding bits selected based on the deterministic function to generate padded message data, and generating the compressed data 640 by using the compression algorithm and the selected compression parameter value on the padded message data. The padding bits may be prefixed to the message data. The padding bits may be constrained to allow an end of the padding bits to be determined by a receiver. Randomizing the padding and/or the compression effectiveness may protect against such length-leakage type attacks.

Another aspect of the invention may reside in a remote station 102, comprising: means 410 for selecting a compression parameter value 690 of a compression algorithm using a deterministic function 630 performed on message data 610; means 410 for compressing the message data using the compression algorithm and the selected compression parameter value to generate compressed data 640, wherein a length of the compressed data is dependent on the compression parameter value; and means for encrypting the compressed data to generate encrypted message data 650.

Another aspect of the invention may reside in a remote station 102, comprising: a processor 410 configured to: select a compression parameter value 690 of a compression algorithm using a deterministic function 630 performed on message data 610; compress the message data using the compression algorithm and the selected compression parameter value to generate compressed data 640, wherein a length of the compressed data is dependent on the compression parameter value; and encrypt the compressed data to generate encrypted message data 650.

Another aspect of the invention may reside in a computer program product, comprising: computer-readable medium 420, comprising: code for causing a computer 400 to select a compression parameter value 690 of a compression algorithm using a deterministic function 630 performed on message data 610; code for causing a computer to compress the message data using the compression algorithm and the selected compression parameter value to generate compressed data 640, wherein a length of the compressed data is dependent on the compression parameter value; and code for causing a computer to encrypt the compressed data to generate encrypted message data 650.

With reference to FIGS. 7-10, another aspect of the invention may reside in a method 700 for protecting message data 810. In the method, the message data is compressed to generate compressed data 840 comprising a first number of data bytes (step 710). The compressed data is padded to generate padded compressed data 835 comprising a second number of data bytes 837, wherein the second number is equal to the first number plus a pad number of data bytes, and the pad number of data bytes is determined based on a hash of the message data (step 720). The padded compressed data is encrypted to generate encrypted message data 850 (step 730).

In more detailed aspects of the invention, the hash 830 of the message data 810 may be a keyed hash 935 of the message data. The keyed hash of the message data may be performed using a Hashing for Message Authentication (HMAC) cryptographic hash function, and may use an obfuscation key derived using a key derivation function. The obfuscation key may be generated from an exchanged secret value. The key derivation function may use an encryption key and an authentication key to generate the obfuscation key. The encryption key and the authentication key may be generated from an exchanged secret value, and from a plurality of non-secret values. The pad number of data bytes may comprise a number from 1 to 32.

A hash or similar function of the uncompressed text 810 may be computed. From the hash value the length of some padding 837 may be determined by some arithmetic or logical operation. For example, the operation may use just the last significant 5 bits of the hash. This will be a number between 0 and 31, which would be the number of bytes of padding 837 that may be added. This technique will frustrate this type of attack, as the length will vary by many bytes on each trial digit, and the correct one is unlikely to be the shortest. The hash function may include a secret, such as the obfuscation key. HMAC is a hash-like function that includes a secret (sometimes HMAC is called a keyed hash).

The secret may be derived as part of the session establishment. It is common to derive an encryption key and an authentication key during session establishment, which keys may be used to derive the length-obfuscation key. The length-obfuscation key would be part of the computation of the length of the padding. Since the attacker does not know the length-obfuscation key, he cannot compute the length of the padding.

An aspect may involve modifying the operation of the compression function. Compression functions generally make many decisions. For example, the compression function often builds "dictionaries" of recently encountered strings. But since storage is limited, at frequent intervals, one or more entries in the dictionary must be discarded. The least recently seen string is often the choice for discarding. However, the choice may be made to depend on the hash of the message. In a practical compression algorithm, there may be many other choices that may be made. Making some or all of these choice to depend on the hash (or keyed hash) of the message may introduce a lot of "noise" into the length.

In practical secure communication systems, there is a protocol that exchanges a secret value, commonly called the pre-master secret, and then uses a key derivation function to combine that with several nonsecret values, so as to generate an encryption key and an authentication key. A third key, such as the padding obfuscation key, may be derived from the encryption key and an authentication key.

In other more detailed aspects of the invention, padding the compressed data 840 to generate padded compressed data may comprise using a compression algorithm 845 modified based on a deterministic function of the message data 810. The message data may comprise a Transport Layer Security (TLS) protocol message, or a Secure Socket Layer (SSL) protocol message. The hash function 830, the padding generator 860, and the encryption function 880, are described above with respect to FIG. 3. The pad number may be determined based on a random number from a random number generator 1035.

Another aspect of the invention may reside in a remote station 102, comprising: means 410 for compressing message data 810 to generate compressed data 840 comprising a first number of data bytes; means 410 for padding the compressed data to generate padded compressed data 835 comprising a second number of data bytes, wherein the second number is equal to the first number plus a pad number of data bytes, and the pad number of data bytes is determined based on a hash of the message data; and means 410 for encrypting the padded compressed data to generate encrypted message data 850.

Another aspect of the invention may reside in a remote station 102, comprising: a processor 410 configured to: compress message data 810 to generate compressed data 840 comprising a first number of data bytes; pad the compressed data to generate padded compressed data 835 comprising a second number of data bytes, wherein the second number is equal to the first number plus a pad number of data bytes, and the pad number of data bytes is determined based on a hash of the message data; and encrypt the padded compressed data to generate encrypted message data 850.

Another aspect of the invention may reside in a computer program product, comprising: computer-readable medium 420, comprising: code for causing a computer 400 to compress message data 810 to generate compressed data 840 comprising a first number of data bytes; code for causing a computer to pad the compressed data to generate padded compressed data 835 comprising a second number of data bytes, wherein the second number is equal to the first number plus a pad number of data bytes, and the pad number of data bytes is determined based on a hash of the message data; and code for causing a computer to encrypt the padded compressed data to generate encrypted message data 850.

The remote station 102 may comprise a computer 400 that includes a processor 410, a storage medium 420 such as memory and/or a disk drive, a display 430, and an input such as a keypad 440, and a wireless connection 450.

Figure 1:
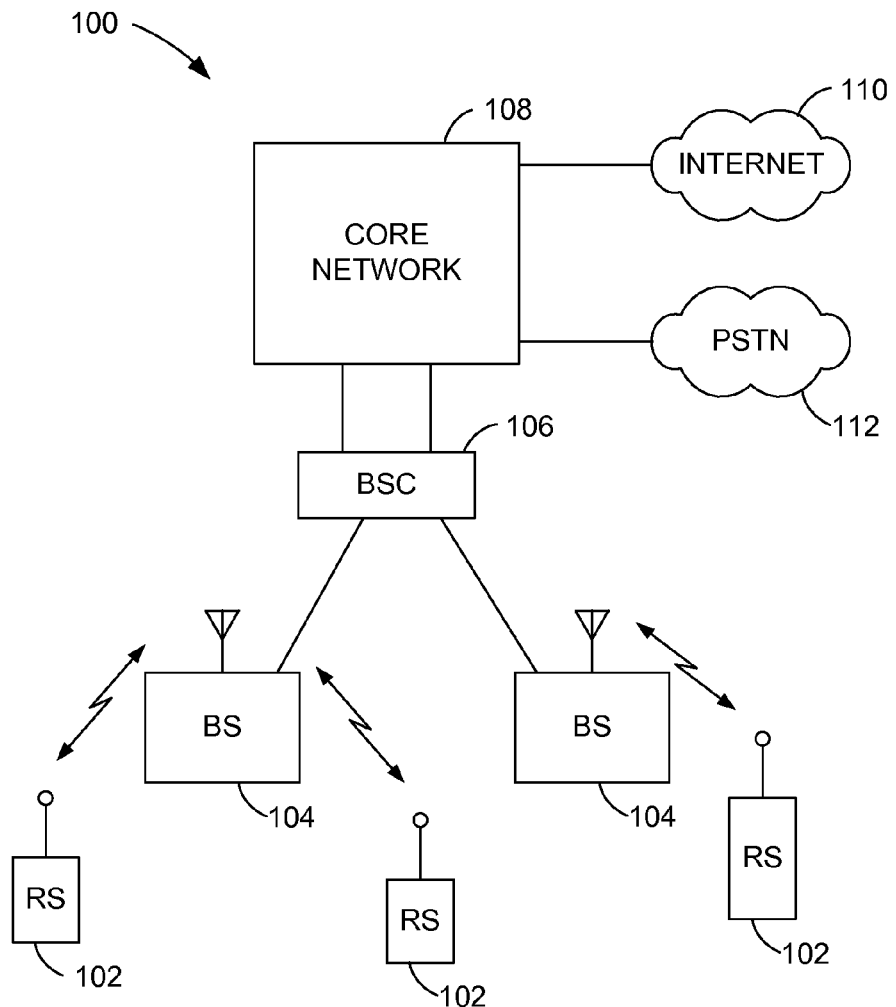
FIG. 1 is a block diagram of an example of a wireless communication system.

With reference to FIG. 1, a wireless remote station (RS) 102 (e.g. a mobile station MS) may communicate with one or more base stations (BS) 104 of a wireless communication system 100. The wireless communication system 100 may further include one or more base station controllers (BSC) 106, and a core network 108. Core network may be connected to an Internet 110 and a Public Switched Telephone Network (PSTN) 112 via suitable backhauls. A typical wireless mobile station may include a handheld phone, or a laptop computer. The wireless communication system 100 may employ any one of a number of multiple access techniques such as code division multiple access (CDMA), time division multiple access (TDMA), frequency division multiple access (FDMA), space division multiple access (SDMA), polarization division multiple access (PDMA), or other modulation techniques known in the art.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both non-transitory computer-readable storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for protecting message data, comprising:
    generating a function output value using a deterministic function performed on the message data, wherein the deterministic function includes a hash function;
    generating a compression parameter value from selected bits of the function output value, wherein a number of bits representing the compression parameter value is less than a number of bits representing the function output value;
    compressing the message data using a compression algorithm to generate compressed data, wherein the compressed data is variably compressed by the compression algorithm such that a length of the compressed data is dependent on the compression parameter value; and
    encrypting the compressed data to generate encrypted message data.

2. The method of claim 1, wherein the compression parameter value is a maximum chain length value.

3. The method of claim 1, wherein compressing the message data comprises:
    padding the message data with a number of padding bits selected based on the deterministic function to generate padded message data; and
    generating the compressed data by using the compression algorithm on the padded message data.

4. The method of claim 3, wherein the padding bits are prefixed to the message data.

5. The method of claim 3, wherein the padding bits are constrained to allow an end of the padding bits to be determined by a receiver.

6. A remote station, comprising:
    means for generating a function output value using a deterministic function performed on message data, wherein the deterministic function includes a hash function;
    means for generating a compression parameter value from selected bits of the function output value, wherein a number of bits representing the compression parameter value is less than a number of bits representing the function output value;
    means for compressing the message data using a compression algorithm to generate compressed data, wherein the compressed data is variably compressed by the compression algorithm such that a length of the compressed data is dependent on the compression parameter value; and
    means for encrypting the compressed data to generate encrypted message data.

7. The remote station of claim 6, wherein the compression parameter value is a maximum chain length value.

8. The remote station of claim 6, wherein the means for compressing the message data comprises:
    means for padding the message data with a number of padding bits selected based on the deterministic function to generate padded message data; and
    means for generating the compressed data by using the compression algorithm on the padded message data.

9. The remote station of claim 8, wherein the padding bits are prefixed to the message data.

10. The remote station of claim 8, wherein the padding bits are constrained to allow an end of the padding bits to be determined by a receiver.

11. A remote station, comprising:
    a processor, implemented as hardware, configured to:
    generate a function output value using a deterministic function performed on message data, wherein the deterministic function includes a hash function;
    generate a compression parameter value from selected bits of the function output value, wherein a number of bits representing the compression parameter value is less than a number of bits representing the function output value;
    compress the message data using a compression algorithm to generate compressed data, wherein the compressed data is variably compressed by the compression algorithm such that a length of the compressed data is dependent on the compression parameter value; and
    encrypt the compressed data to generate encrypted message data.

12. The remote station of claim 11, wherein the compression parameter value is a maximum chain length value.

13. The remote station of claim 11, wherein the processor is further configured to:
pad the message data with a number of padding bits selected based on the deterministic function to generate padded message data; and
generate the compressed data by using the compression algorithm on the padded message data.

14. The remote station of claim 13, wherein the padding bits are prefixed to the message data.

15. The remote station of claim 13, wherein the padding bits are constrained to allow an end of the padding bits to be determined by a receiver.

16. A non-transitory computer-readable medium, comprising:
code for causing a computer to generate a function output value using a deterministic function performed on message data, wherein the deterministic function includes a hash function;
code for causing a computer to generate a compression parameter value from selected bits of the function output value, wherein a number of bits representing the compression parameter value is less than a number of bits representing the function output value;
code for causing a computer to compress the message data using a compression algorithm to generate compressed data, wherein the compressed data is variably compressed by the compression algorithm such that a length of the compressed data is dependent on the compression parameter value; and
code for causing a computer to encrypt the compressed data to generate encrypted message data.

17. The non-transitory computer-readable medium of claim 16, wherein the compression parameter value is a maximum chain length value.

18. The non-transitory computer-readable medium of claim 16, further comprising:
code for causing a computer to pad the message data with a number of padding bits selected based on the deterministic function to generate padded message data; and
code for causing a computer to generate the compressed data by using the compression algorithm on the padded message data.

19. The non-transitory computer-readable medium of claim 18, wherein the padding bits are prefixed to the message data.

20. The non-transitory computer-readable medium of claim 18, wherein the padding bits are constrained to allow an end of the padding bits to be determined by a receiver.

21. The method of claim 1, wherein the deterministic function is performed on the message data no more than one time to generate the function output value.

* * * * *